United States Patent [19]
Pruvost et al.

[11] 3,884,847
[45] May 20, 1975

[54] PROCESS FOR THE PREPARATION OF SO-CALLED COLD-CURED FLEXIBLE POLYURETHANE

[75] Inventors: Pierre Pruvost, Lyon; Jacques Cluchat, Saint-Cord, both of France

[73] Assignee: Rhone-Poulenc, S.A., Paris, France

[22] Filed: July 19, 1973

[21] Appl. No.: 380,693

[30] Foreign Application Priority Data
July 20, 1972 France .......................... 72.26231

[52] U.S. Cl. ..................... 260/2.5 AH; 260/2.5 BD
[51] Int. Cl. ............................................. C08g 22/44
[58] Field of Search ................. 260/2.5 AH, 2.5 BD

[56] References Cited
UNITED STATES PATENTS

| | | | |
|---|---|---|---|
| 3,703,486 | 11/1972 | Keil .............................. | 260/2.5 AH |
| 3,706,681 | 12/1972 | Bachura ....................... | 260/2.5 AH |
| 3,741,917 | 6/1973 | Morehouse .................. | 260/2.5 AH |
| 3,796,676 | 3/1974 | Kanner ........................ | 260/2.5 AH |

FOREIGN PATENTS OR APPLICATIONS

| | | |
|---|---|---|
| 2,086,977 | 12/1971 | France |
| 2,031,770 | 11/1970 | France |

*Primary Examiner*—Donald E. Czaja
*Assistant Examiner*—C. Warren Ivy
*Attorney, Agent, or Firm*—Stevens, Davis, Miller & Mosher

[57] ABSTRACT

Polyurethane foams having a smooth and homogeneous surface appearance, showing little or no shrinkage, and consequently requiring little or no calendering, and any calendering required need not be carried out immediately after moulding, are obtained by preparing the foam in the presence of 0.1 – 5 % of an organo silicon compound which is: (1) an organopolysiloxane comprising units of the formulae $R_2SiO$ and $RSiO_{1.5}$ having a R/Si ratio ranging from 1.05 to 1.5 and containing at least 1% by weight of hydroxyl groups bonded to silicon atoms, each symbol R, which may be the same or different, representing a monovalent hydrocarbon radical of 1 to 7 carbon atoms, or (2) a compound of the general formula

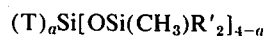

F₁ or

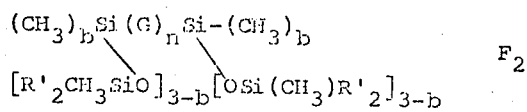

F₂ in which each symbol R', which may be the same or different, represents a hydrogen atom, a monovalent hydrocarbon group of 1 to 8 carbon atoms, or a monovalent halogenohydrocarbon group of 1 to 3 carbon atoms; each symbol T, which may be the same or different, represents a hydrogen atom, a monovalent hydrocarbon group of 1 to 15 carbon atoms, or a monovalent halogenohydrocarbon group of 1 to 6 carbon atoms; each symbol G represents a divalent hydrocarbon group of 1 to 15 carbon atoms; n represents zero or 1; a represents zero, 1 or 2; and b represents 1 or 2.

5 Claims, No Drawings

PROCESS FOR THE PREPARATION OF SO-CALLED COLD-CURED FLEXIBLE POLYURETHANE

The present invention relates to a process for the preparation of so-called "cold-cured" flexible polyurethane foams by incorporating small amounts of organosilicon compounds into the foamable compositions. This process makes it possible to carry out the calendering of the resulting foams at any time whatsoever after they have been released from the mould or even to avoid calendering altogether, and furthermore assists the formation of a thin, light, porous skin at the surface of the foams.

It is known that so-called cold-cured flexible polyurethane foams do not require subsequent stoving, after they have been released from the moulds, in order to complete their crosslinking. It is also known that such foams can be prepared from particular polyetherpolyols, polyisocyanates, water and optionally pore-forming agents and non-metallic catalysts, (see French Pat. Nos. 2,031,770 and 2,086,977). The particular structure of the polyether-polyols which are used makes it possible, furthermore, to employ mixtures of polyisocyanates which have not necessarily been refined, based, for example, on p,p'-diisocyanatodiphenylmethane and toluylenediisocyanate.

It is however necessary, and this is a significant disadvantage, to calender the foams as soon as they have been released from the mould to avoid the extensive and permanent collapse which is called shrinkage. This collapse is produced, during cooling, by the contraction of the gases retained in the closed cells of the foams; the purpose of the calendering is thus to open these cells and to remove the occluded gases, but it does not overcome the skin effect at the surface of the foams, this effect being caused by the presence of a thick surface layer with a rough appearance.

The need to calender thus leads, in continuous manufacturing processes, to the use of calendering machines which are designed to operate at a rate corresponding to the rate of production of the foam-making machines. This inter-relationship is always a handicap for continuous production.

Furthermore, when the foams have a complicated geometric shape or contain metal inserts in their mass, the calendering must most frequently be carried out by hand, by moulding the newly manufactured foam while it is still hot; this process then necessitates the use of a large amount of manual labour.

The present invention provides a process for the preparation of cold-cured flexible polyurethane foams by pouring a foamable composition into a mould, closing the mould, forming the foam and releasing the foam from the mould, wherein the foamable composition contains 0.1 to 5% of its weight of an organosilicon compound which is:

1. an organopolysiloxane comprising units of the formulae $R_2SiO$ and $RSiO_{1.5}$ having a R/Si ratio ranging from 1.05 to 1.5 and containing at least 1% by weight of hydroxyl groups bonded to silicon atoms, each symbol R, which may be the same or different, representing a monovalent hydrocarbon radical of 1 to 7 carbon atoms, or 2. a compound of the general formula

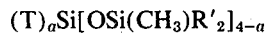

or

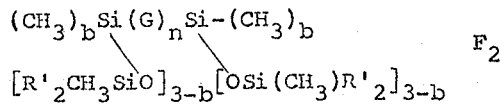

in which each symbol R', which may be the same or different, represents a hydrogen atom, a monovalent hydrocarbon group of 1 to 8 carbon atoms, or a monovalent halogenohydrocarbon group of 1 to 3 carbon atoms; each symbol T, which may be the same or different, represents a hydrogen atom, a monovalent hydrocarbon group of 1 to 15 carbon atoms, or a monovalent halogenohydrocarbon group of 1 to 6 carbon atoms; each symbol G represents a divalent hydrocarbon group of 1 to 15 carbon atoms; $n$ represents zero or 1; $a$ represents zero, 1 or 2; and $b$ represents 1 or 2.

The foams produced according to this process have a smooth and uniform surface appearance, show little or no shrinkage and thus require only little or no calendering, which, when it is necessary, can be delayed for a time.

R preferably represents an alkyl radical of 1 to 4 carbon atoms such as a methyl, ethyl, propyl, isopropyl and n-butyl radical or an aryl radical of 6 to 7 carbon atoms such as phenyl and methylphenyl radicals.

R' preferably represents an alkyl radical or 1 to 8 carbon atoms such as a methyl, ethyl, propyl, isopropyl, butyl, pentyl, hexyl, isohexyl or octyl radical; a halogenoalkyl radical with 1 to 3 carbon atoms such as a chloromethyl, 3-chloro-propyl or 3,3,3-trifluoro-propyl radical; an alkenyl radical with 2 to 4 carbon atoms such as a vinyl, allyl or butenyl radical; or an aryl radical with 6 to 8 carbon atoms such as a phenyl, tolyl and xylyl radical.

T preferably represents an alkyl radical with 1 to 15 carbon atoms such as a methyl, ethyl, propyl, butyl, pentyl, hexyl, isohexyl octyl, decyl, tetradecyl or pentadecyl radical; a halogenoalkyl radical with 1 to 3 carbon atoms such as a chloromethyl, 3-chloro-propyl or 3,3,3-trifluoro-propyl radical; an alkenyl radical with 2 to 4 carbon atoms such as a vinyl, allyl or butenyl radical; a cycloaliphatic radical with 5 to 6 carbon atoms in the ring such as a cyclohexyl, cyclopentyl or cyclohexenyl radical, an aryl radical with 6 to 9 carbon atoms such as phenyl, tolyl, xylyl or cumenyl radical; a benzyl radical; or a halogenophenyl radical such as a chlorophenyl, dichlorophenyl, trichlorophenyl or tetrachlorophenyl radical. G preferably represents a monocyclic or bicyclic arylene radical with 6 to 15 carbon atoms such as a phenylene or biphenylene radical which may or may not be substituted by methyl, ethyl and propyl groups; or an alkylene radical with 1 to 8 carbon atoms such as those of the formulae:

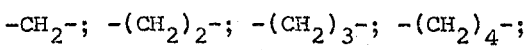

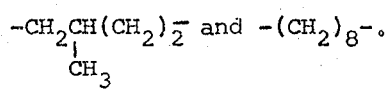

More specifically, the organosilicon compounds of the formulae $F_1$ and $F_2$ can correspond to the formulae below.

1. Compounds corresponding to the formula $F_1$ in which $a = 2$
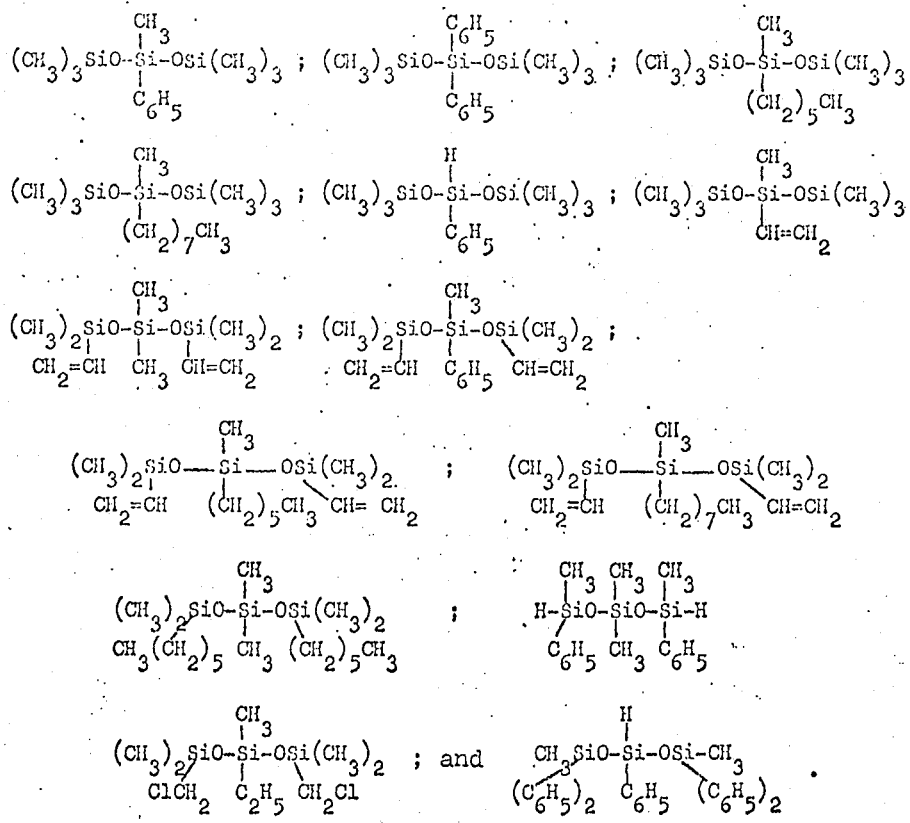
2. Compounds corresponding to the formula $F_1$ in which $a = 1$
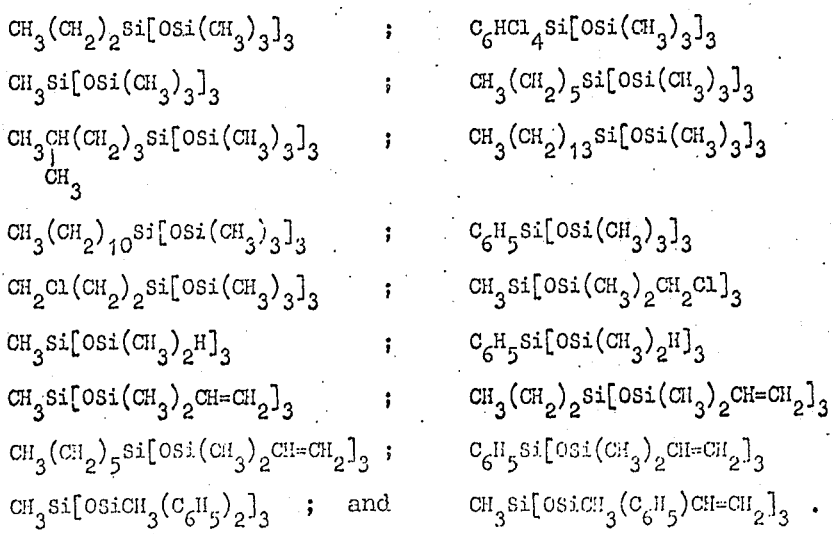

3. _Compounds corresponding to the formula $F_1$ in which a = 0_

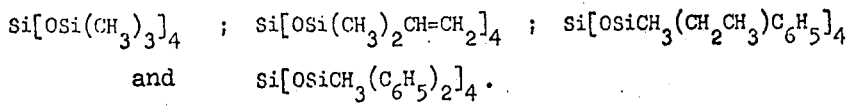

4. _Compounds corresponding to the formula $F_2$ in which n = 0_

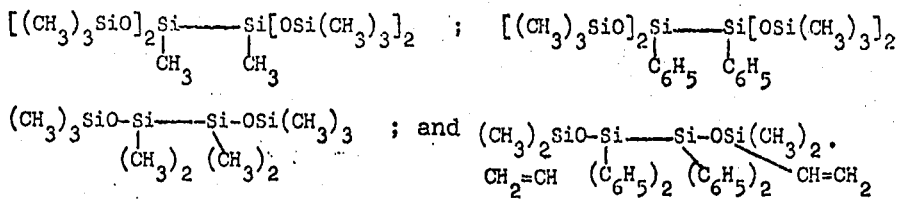

5. _Compounds corresponding to the formula $F_2$ in which n = 1_

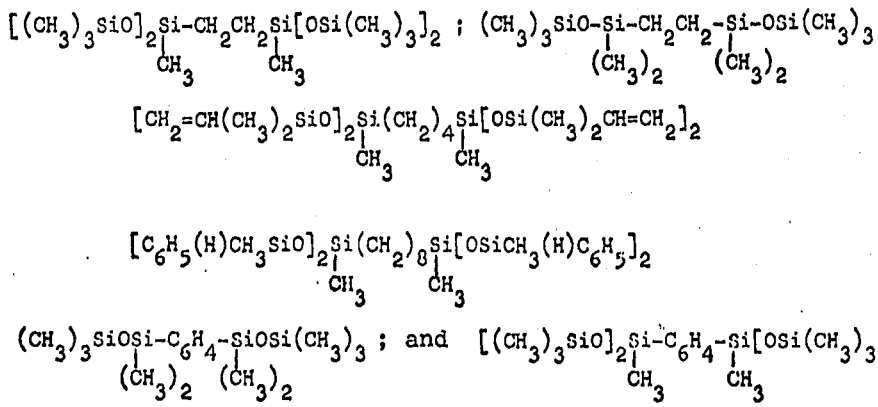

The organopolysiloxanes used according to the process of the invention can be obtained by conventional hydrolysis of mixtures of organochlorosilanes of the general formula $R_mSiCl_{4-m}$ in which the symbol $m$ represents 1 or 2. These organochlorosilanes include methyltrichlorosilane, dimethyldichlorosilane, phenyltrichlorosilane, diphenyldichlorosilane and methylphenyldichlorosilane. During their hydrolysis, they are mixed in a proportion such that the organopolysiloxanes resulting therefrom, as already indicated, necessarily consist of units of the formulae $R_2SiO$ and $RSiO_{1.5}$, the R/Si ratio ranging from 1.05 to 1.5. Furthermore, these organopolysiloxanes contain at least 1% by weight of hydroxyl groups bonded to silicon atoms.

In order to prepare them, the hydrolysis is carried out in a customary solvent medium. It is possible to use an alkane such as hexane and heptane or a cycloalkane such as cyclohexane and methylcyclohexane or an aromatic hydrocarbon such as toluene, xylene and cumene. The organopolysiloxanes thus produced are resinous products and they can be used in the form of solutions in the abovementioned solvents at a concentration of at least 40% by weight. These solutions have rather low viscosities situated in the range 20 to 500 cPo at 25°C.

The organosilicon compounds of the formula $F_1$, can also be prepared by well known techniques such as cohydrolysis of mixtures of chlorosilanes in definite amounts, these being mixtures which contain a silane of the formula $CH_3R'_2SiCl$ and another silane of the formulae $SiCl_4$, $T—SiCl_3$ or $T_2SiCl_2$, the symbols $R'$ and $T$ having the above-mentioned meaning; this cohydrolysis may or may not be carried out in an organic solvent medium [French Pat. Nos. 1,186,202 and 1,201,735 and U.S. Pat. Nos. 2,831,010 and 2,877,255].

Other less common processes can also be used, such as:
a. the reaction of silanediols with chlorosilanes or aminosilanes [U.S. Pat. No. 3,133,110],
b. the attachment of siloxanes possessing SiH bonds to derivatives with acetylenic or vinyl bonds [French Pat. No. 1,224,081 and U.S. Pat. Nos. 2,928,806 and 3,002,987],
c. the reaction of chlorosilanes with alkali metal silanolates [French Pat. Nos. 968,178 and 1,168,926 ]and
d. the rearrangement of siloxanes in the presence of an acid or basic catalyst [French Pat. No. 1,400,267].

The organosilicon compounds of the formula $F_2$ can be prepared by cohydrolysis, which may or may not be carried out in an organic solvent medium, of mixtures of organosilicon compounds with SiCl bonds in definite amounts, these being mixtures which contain a silane of the formaula $CH_3R'_2SiCl$ and another silane of the formulae $CH_3Cl_2Si—SiCl_2CH_3$, $(CH_3)_2ClSi—SiCl(CH_3)_2$, $CH_3Cl_2Si—G—SiCl_2CH_3$ and $(CH_3)ClSi—G—SiCl(CH_3)_2$, the symbols $R'$ and $G$ having the above-mentioned meaning [McKay, Dissert Abstr., 17, 225 (1957)]. Likewise, it is possible to prepare them by other methods such as the above-mentioned addition reaction of siloxanes wiht SiH bonds to compounds with acetylenic or vinyl bonds (French Pat. No. 1,224,081).

However, in order to obtain the organopolysiloxanes of resinous nature as well as the compounds of the formulae $F_1$ and $F_2$ with valuable yields, whilst isolating them easily from their reaction medium, it is preferable to react the starting organochlorosilanes according to a particular technique, in the present instance with tertiary aliphatic alcohols with 4 to 8 carbon atoms or mixtures of these tertiary alcohols with primary or secondary alcohols with 1 to 4 carbon atoms. This type of reaction is described more specifically in French Pat. No. 2,086,349 and in U.S. Pat. Nos. 3,432,538 and 3,484,468.

In general, it is possible to use 0.5 to 1.2 mols of tertiary aliphatic alcohol per gram atom of chlorine bonded to a silicon atom and 0.3 to 0.8 mol of primary or secondary alcohol per mol of tertiary alcohol employed. The tertiary alcohol can be tertiary butyl alcohol, tertiary amyl alcohol, 2-methyl-2-pentanol, 2-methyl-but-3-en-2-ol or 2,3-dimethyl-2-butanol. The primary or secondary alcohol can be methyl, ethyl, propyl, isopropyl, butyl or isobutyl alcohol.

The reaction can take place at a temperature between 0° and 100°C. It is however advantageous to carry out the reaction in a first stage at a low temperature of about 0°–10°C to avoid the formation of by-products. In a second stage, the temperature of the reaction mixture is allowed to rise to ambient temperature or the mixture is even heated to a temperature of 50°–80°C so as rapidly to obtain a separation of phases: the water formed, the tertiary alcohol optionally in excess and the primary or secondary alcohol optionally present forming the lower phase and the desired organosilicon compounds mixed with the chloride corresponding to the tertiary alcohol employed forming the upper phase.

In order to facilitate the separation of the two phases, it is advantageous, in the case of the preparation of the compounds of the formulae $F_1$ and $F_2$ to use an organic solvent which dissolves them and hence prevents them from passing partially into the aqueous-alcoholic phase. In the case of the resinous organopolysiloxanes, the presence of a solvent is absolutely necessary in practice in order to dissolve them and hence to prevent them from changing to form a gel.

These solvents can be:
a. Alkanes such as hexane, heptane and conventional petroleum sections,
b. cycloalkanes suchas cyclohexane and methylcyclohexane,
c. aromatic hydrocarbons such as toluene, xylene and cumene or
d. ethers such as diethyl ether and isopropyl ether.

The compounds of the formulae $F_1$ and $F_2$ are then isolated by treating the organic phase in which they are present in accordance with conventional processes, for example, by distillation, and the resinous organopolysiloxanes are isolated in the form of solutions in which the concentration of solid material is at least 40% by weight, as already mentioned above.

These products are incorporated into the compositions for flexible polyurethane foams at the rate of 0.1 to 5% of the weight of these compositions, and preferably 0.3 to 3%. They can be added to the compositions which are ready to be poured into the moulds or they can be added beforehand to the stable mixtures which contain all the constituents for making the foams with the exception, however, of the organic polyisocyanates. After the compositions have been poured into the moulds and the latter have been closed, the compositions expand and cure to give foams which assume the desired shape.

The foams obtained have a smooth and porous surface with a uniform appearance and they do not shrink or at most the shrinkage is 12% of the original thickness and this applies when the amounts of additives are less than 1%; however, a simple manual calendering, which can take place several hours after the release from the mould, eliminates this shrinkage easily.

In addition to their excellent surface appearance, the foams also possess good mechanical properties and in particular are strong and are resistant to crushing.

The foams manufactured according to the process of the invention can be used mainly in the car industry, the furniture industry and the packaging industry (cushions, seats, mattresses and materials which provide protection against impact).

The following examples illustrate the invention.

EXAMPLE 1

A mixture formed from 60 mol% of methyltrichlorosilane, 30 mol% of phenyltrichlorosilane and 10 mol% of diphenyldichlorosilane is prepared. This mixture is diluted with toluene so as to obtain a solution containing 43% by weight of chlorosilane.

The above solution in toluene is injected into the autoclave containing the water for hydrolysis (present at the rate of 1.25 mols per gram atom of chlorine bonded to silicon), at a rate such that the temperature of the mixture remains below 30°C. Once the addition is complete, the mixture is heated slowly to 80° to 85°C in order to complete the reaction. The mixture is cooled and the acid layer is decanted. The solution in toluene is washed with pure water until it is neutral. A part of the toluene is removed under a vacuum of 30 mm in order to bring the final concentration of resin to 60% by weight. A resin (B) is thus obtained, the viscosity of the 60% strength solution of which is about 50 cPo at 25°C, this being a resin which has 1.1 organic groups per silicon atom and contains about 4% by weight of hydroxyl groups bonded to silicon atoms.

EXAMPLE 2

The method is identical to Example 1, but the diphenyldichlorosilane is replaced by 10 mol% of dimethyldichlorosilane. The solution of the silicone resin obtained (C) has a viscosity of 35 cPo at 25°C. This resin has the same organic group/Si ratio as the resin B of Example 1 and contains about 3% of hydroxyl groups bonded to silicon atoms.

EXAMPLE 3

The method is identical to Example 1, but the proportions employed are 32 mols of methyltrichlorosilane, 38.7 mols of phenyltrichlorosilane and 29.3 mols of dimethyldichlorosilane. A resin (D) is obtained, and a solution thereof which contains 60% of solid material has a viscosity of 35 cPo at 25°C. This ratio has an organic group/Si ratio of 1.3 and contains 3.5% by weight of hydroxyl groups bonded to silicon atoms.

EXAMPLE 4

The method is identical to that of Example 1, but 31.2 mol% of methyltrichlorosilane, 31.2 mol% of phenyltrichlorosilane, 30 mol% of phenylmethyldichlorosilane and 7.6 mol% of diphenyldichlorosilane are employed in carrying it out. A resin (E) is obtained, and a solution thereof which contains 60% of solid material has a viscosity of 110 cPo at 25°C. This resin has an organic group/Si ratio of 1.38 and contains about 5% by weight of hydroxyl groups bonded to silicon atoms.

EXAMPLE 5

A composition U is prepared by mixing the following ingredients (the parts being by weight):
100 parts of a mixture consisting of 90 parts of a polyether-triol containing 15% by weight of —OCH$_2$CH$_2$— units, with a hydroxyl number of 35 and molecular weight of 5,000, and 10 parts of a polyether-diol containing 75% by weight of —OCH$_2$CH$_2$— and

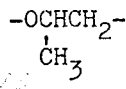

units [taken in the numerical ratio of 50/50], of molecular weight 800,
2.5 parts of water,
0.8 part of dimethylcyclohexylamine and
0.8 part of a 33% strength solution of triethylenediamine in dipropylene glycol.

Another composition U', with an isocyanate number of about 100, is prepared by mixing 70 parts of p,p'-diisocyanatodiphenylmethane and 30 parts of toluylenediisocyanate 80–20.

One hundred seventy-seven g of the composition U are mixed intimately with 70 g of the composition U', and the composition U" resulting therefrom is poured into a parallelepiped mould of 200 × 200 × 100 mm which is immediately closed. The substance is released from the mould after 10 minutes. On being released from the mould, the sample has the dimensions of the mould, that is to say, 200 × 200 × 100 mm. If calendered immediately, it acquires its flexibility and retains its shape. If it is not calendered, after standing for 35 minutes the sample sags so that its height at the center is no more than 80 mm, the side walls also collapsing towards the inside. Subsequent calendering does not make it possible to recover the original dimensions nor the desired flexibility. Finally, the rough appearance of the skin coating the block of foam increases this feeling of non-flexibility and heterogeneity. This foam has a density of about 50 g/l.

If 0.3 part by weight (corresponding to 0.2% of the composition U") of one of the silicone solutions prepared in Examples 1, 2, 3 or 4 is added to the mixture U which has been prepared beforehand, the results obtained are markedly different and are summarized in Tables I to V.

TABLE I

Shrinkage values, measured after opening the lid of the mould, as a function of time

| Time in minutes | Control without additive | +0.2% additive B | +0.2% additive C | +0.2% additive D | +0.2% additive E |
|---|---|---|---|---|---|
| 0 | +25 | 0 | +5 | +10 | +15 |
| 5 | −10 | −1 | −2 | 0 | −1 |
| 10 | −20 | −1 | −4 | −3 | −4 |
| 15 | −25 | −2 | constant | −6 | −6 |
| 20 | −22 | constant | constant | −9 | −10 |
| 25 | −20 | constant | constant | constant | constant |
| 30 | −18 | constant | constant | constant | constant |
| 35 | −17 | constant | constant | constant | constant |

TABLE II

Notes on the calendering, shrinkage after calendering

| | Control without additive | +0.2% additive B | +0.2% additive C |
|---|---|---|---|
| Notes on the calendering | Difficult. Must be carried out immediately | Easy. Can be delayed for a period of time | Easy. Can be delayed for a period of time |
| Shrinkage after calendering | −8 | 0 | 0 |

TABLE III

Uniformity of the density

| | Control without additive | +0.2% additive B | +0.2% additive C |
|---|---|---|---|
| Average density of the moulded object | 50 | 50 | 50 |
| Density of the centre sample | 47 | 49.5 | 49 |
| Ratio of the average density to the sample density | 1.065 | 1.010 | 1.020 |

TABLE IV

Measurement of the rebound on samples which have been calendered immediately or after standing for 60 hours

| | Control without additive | | +0.2% additive B | | +0.2% additive C | | +0.2% additive D | |
|---|---|---|---|---|---|---|---|---|
| | calendering | | calendering | | calendering | | calendering | |
| | immediately | after 60 hours | immediately | after 60 hours | immediately | after 60 hours | immediately | after 60 hours |
| Rebound % | 55 | not significant | 52 | 52 | 52 | 52 | 50 | 49 |

TABLE V

Measurement of the lift in g/cm² - Determination of the "SAG FACTOR" immediately after calendering or after standing for 60 hours before calendering

| % Crushing | Control without additive | | +0.2% additive B | | +0.2% additive C | | +0.2% additive D | | +0.2% additive E | |
|---|---|---|---|---|---|---|---|---|---|---|
| | immediately | after 60 hours | immediately | after 60 hours | immediately | after 60 hours | immediately | after 60 hours | immediately | after 60 hours |
| 25 | 18 | not | 17 | 22 | 18 | 20 | 25 | 26 | 28 | not |
| 50 | 28 | sig- | 28 | 34 | 27 | 30 | 37 | 40 | 45 | sig- |
| 65 | 44 | nifi- | 47 | 58 | 50 | 52 | 60 | 67 | 73 | nifi- |
| 75 | 90 | cant | 87 | 100 | 90 | 92 | 104 | 110 | 115 | cant |
| SAG FACTOR | 2.54 | | 2.78 | 2.64 | 2.77 | 2.60 | 2.40 | 2.57 | 2.61 | |

The following tests were used.

1. Shrinkage 10 minutes after casting, the lid of the mould is removed and the foam is left to cool, without being touched. The sagging of the foam is measured at 5 minute intervals. This sagging is expressed as a percent relative to the initial height. Sometimes, on opening the mould, a positive swelling of the material can be observed. This will be given a number with a + sign. The number will be followed by a − sign in the case of sagging. After 35 minutes, stabilization is generally reached.

2. Calendering

After 35 minutes, the block of foam is released from the mould. The foam is kneaded by hand and the ease with which the foam recovers its dimensions and acquires its properties is evaluated. The residual shrinkage is noted. The latter must be as low as possible or even zero.

3. Uniformity of the density — Effect of the surface skin

The average density of the block of foam is measured in g/l in comparison to the density of a sample of 40 × 40 × 40 mm removed from the center of the block. The skin effect is the more marked and the uniformity of the density is the greater, the more the ratio of the two densities measured tends towards unity. The homogeneity of the structure and hence of the density gives a porous surface which is soft to the touch.

4. Rebound

The measurements are made in accordance with Standard Specification ASTM D 1564–62T. They consist of measuring the rebound of a steel ball of exact weight which falls from a given height onto a sample of foam inclined relative to the axis of fall. The results are expressed in percent. The higher the number is, the better are the elastic properties of the foam.

5. Lift

Expressed as the percent crushing of a sample of 40 × 40 × 40 mm as a function of the pressure exerted.

6. "SAG FACTOR"

This factor is calculated as the ratio of pressures exerted during lift tests for crushings of 65 to 25%. The ratio obtained is the higher, the higher, too, are the mechanical properties of the foam.

EXAMPLE 6

Preparation of products corresponding to the formula $F_1$ in which $a = 2$.

a. A water-ice bath is placed under a 5 l flask which is equipped with a condenser, a stirrer, a dropping funnel and a thermometer, in order to cool its contents, and 5.5 mols of tertiary amyl alcohol, 2.7 mols of isopropyl alcohol and 600 g of toluene are introduced. A mixture of chlorosilanes consisting of 1 mol of the product of the formula $T_2SiCl_2$ and 3.5 mols of the product of the formula $(CH_3)R'_2SiCl$, the symbols T and R' having the above-mentioned meaning, is run into this solution which is kept at a temperature of 5°C.

b. When the introduction is complete, the reaction is allowed to continue, still at 5°C, with stirring, for 2 hours. The water-ice bath is then replaced by a hot water bath so that the temperature of the reaction mixture rises to 65°C over the course of 1 hour. At the end of this period of time, a separation of phases then takes place. Stirring is stopped and the solution obtained is left to stand for 45 minutes in a separating funnel. The lower aqueous-alcoholic phase is removed and the upper organic phase is distilled, firstly at atmospheric pressure up to a temperature of 165°C in the mixture so as to remove the tertiary amyl chloride formed and the toluene, and then under reduced pressure in order to collect the desired product. The properties of the organosilicon compounds obtained, and their yields, are given in Table VI below.

EXAMPLE 7

Preparation of products corresponding to the formula $F_1$ in which $a = 1$.

Eight mols of tertiary amyl alcohol, 4 mols of isopropyl alcohol and 600 g of toluene are introduced into a 5 l flask equipped as described in Example 6. A mixture of chlorosilanes consisting of one mol of the product of the formula $TSiCl_3$ and 5 mols of the product of the formula $CH_3R'_2SiCl$ is run into the above mixture which is kept at a temperature of 5°C. The same procedure is then followed as described in part (b) of Example 6, and organosilicon compounds are obtained, the physical properties and yields of which are given in Table VII below.

TABLE VII

| Starting silanes | | Products obtained | Boiling point | Density $d_4^{20}$ | Refractive index $d_D^{20}$ | Viscosity in cSt at 25°C | Yield in % |
|---|---|---|---|---|---|---|---|
| $CH_3R'_2SiCl$ | $TSiCl_3$ | | | | | | |
| $(CH_3)_3SiCl$ | $CH_3(CH_2)_2SiCl_3$ | $CH_3(CH_2)_2Si[OSi(CH_3)_3]_3$ | B.p.$_{13}$=88°C | 0.852 | 1.396 | 2.41 | 84 |
| $CH_2=CH(CH_3)_2SiCl$ | $C_6H_5SiCl_3$ | $C_6H_5Si[OSi(CH_3)_2CH=CH_2]_3$ | B.p.$_3$=127°( | 0.944 | 1.458 | 4.2 | 76 |
| $(CH_3)_3SiCl$ | $C_6HCl_4SiCl_3$ | $C_6HCl_4Si[OSi(CH_3)_3]_3$ | B.p.$_5$=160°C | 1.159 | 1.483 | solid | 50 |
| $(CH_3)_3SiCl$ | $CH_3SiCl_3$ | $CH_3Si[OSi(CH_3)_3]_3$ | B.p.$_4$=70°C | 0.847 | 1.386 | 1.57 | 68 |
| $(CH_3)_3SiCl$ | $CH_3(CH_2)_5SiCl_3$ | $CH_3(CH_2)_5Si[OSi(CH_3)_3]_3$ | B.p.$_5$=107°C | 0.863 | 1.405 | 3.07 | 65 |
| $(CH_3)_3SiCl$ | $CH_3(CH_3)CH(CH_2)_3SiCl_3$ | $CH_3(CH_3)CH(CH_2)_3Si[OSi(CH_3)_3]_3$ | B.p.$_3$=100°C | 0.851 | 1.404 | 3 | 87 |
| $CH_2=CH(CH_3)_2SiCl$ | $CH_3(CH_2)_2SiCl_3$ | $CH_3(CH_2)_2Si[OSi(CH_3)_2CH=CH_2]_3$ | B.p.$_3$=96°C | 0.885 | 1.422 | 2.8 | 80 |
| $(CH_3)_3SiCl$ | $CH_3(CH_2)_{13}SiCl_3$ | $CH_3(CH_2)_{13}Si[OSi(CH_3)_3]_3$ | B.p.$_4$=173°C | — | — | — | 52 |
| $CH_2=CH(CH_3)_2SiCl$ | $CH_3(CH_2)_5SiCl_3$ | $CH_3(CH_2)_5Si[OSi(CH_3)_2CH=CH_2]_3$ | B.p.$_4$=130°C | 0.88 | 1.427 | 3.25 | 83 |
| $CH_2=CH(CH_3)_2SiCl$ | $CH_3SiCl_3$ | $CH_3Si[OSi(CH_3)_2CH=CH_2]_3$ | B.p.$_6$=91°C | 0.883 | 1.415 | 1.9 | 78 |
| $H(CH_3)_2SiCl$ | $CH_3SiCl_3$ | $CH_3Si[OSi(CH_3)_2H]_3$ | B.p.$_{27}$=69°C | — | — | — | — |
| $(CH_3)_3SiCl$ | $CH_2Cl(CH_2)_2SiCl_3$ | $CH_2Cl(CH_2)_2Si[OSi(CH_3)_3]_3$ | B.p.$_5$=127–129°C | 0.926 | 1.412 | 3.44 | 81 |
| $ClCH_2(CH_3)SiCl$ | $CH_3SiCl_3$ | $CH_3Si[OSi(CH_3)_2CH_2Cl]_3$ | B.p.$_6$=146–147°C | 1.087 | 1.438 | 6.04 | 73 |
| $(CH_3)_3SiCl$ | $C_6H_5SiCl_3$ | $C_6H_5Si[OSi(CH_3)_3]_3$ | B.p.$_1$=105°C | 0.919 | 1.435 | 3.7 | — |

EXAMPLE 8

Preparation of products corresponding to the formula $F_1$ in which $a = 0$.

Five mols of tertiary amyl alcohol, 2.5 mols of isopropyl alcohol and 600 g of toluene are introduced into a 5 l flask equipped as described in Example 6. A mixture of chlorosilanes consisting of one mol of $SiCl_4$ and 6.5 mols of the product of the formula $CH_3R'_2SiCl$, is run into this solution which is kept at a temperature of 5°C. The procedure as shown in part (b) of Example 6 is

TABLE VI

| Starting silanes | | Products obtained | Boiling point | Density $d_4^{20}$ | Refractive index $n_D^{20}$ | Viscosity in cSt at 25°C | Yield % |
|---|---|---|---|---|---|---|---|
| $CH_3R'_2SiCl$ | $T_2SiCl_2$ | | | | | | |
| $(CH_3)_3SiCl$ | $CH_3(C_6H_5)SiCl_2$ | $(CH_3)_3SiOCH_3(C_6H_5)SiOSi(CH_3)_3$ | B.p.$_5$=93°C | 0.909 | 1.445 | 2.23 | 77 |
| $(CH_3)_3SiCl$ | $(C_6H_5)_2SiCl_2$ | $(CH_3)_3SiO(C_6H_5)_2SiOSi(CH_3)_3$ | B.p.$_5$=140°C | 0.973 | 1.49 | 7.4 | 85 |
| $(CH_3)_3SiCl$ | $(CH_3)CH_3(CH_2)_5SiCl_2$ | $(CH_3)_3SiO(CH_3)CH_3(CH_2)_5SiOSi(CH_3)_3$ | B.p.$_3$=77°C | 0.831 | 1.407 | 2.04 | 68 |
| $(CH_3)_3SiCl$ | $(CH_3)CH_3(CH_2)_7SiCl_2$ | $(CH_3)_3SiO(CH_3)CH_3(CH_2)_7SiOSi(CH_3)_3$ | B.p.$_3$=155°C | — | — | — | 62 |
| $(CH_3)_3SiCl$ | $H(C_6H_5)SiCl_2$ | $(CH_3)_3SiO—H(C_6H_5)SiOSi(CH_3)_3$ | B.p.$_4$=86°C | 0.912 | 1.445 | 1.84 | 36 |
| $(CH_3)_3SiCl$ | $(CH_2=CH)CH_3SiCl_2$ | $(CH_3)_3SiO(CH_2=CH)CH_3SiOSi(CH_3)_3$ | B.p.$_4$=35°C | 0.832 | 1.395 | 1.13 | 42 |
| $CH_2=CH(CH_3)_2SiCl$ | $(CH_3)CH_3(CH_2)_7SiCl_2$ | $CH_2=CH(CH_3)_2SiO(CH_3)CH_3(CH_2)_7SiOSi(CH_3)_2CH=CH_2$ | B.p.$_{10}$=138°C | 0.855 | 1.429 | 2.95 | 66 |
| $CH_2=CH(CH_3)_2SiCl$ | $(CH_3)CH_3(CH_2)_5SiCl_2$ | $CH_2=CH(CH_3)_2SiO(CH_3)CH_3(CH_2)_5SiOSi(CH_3)_2CH=CH_2$ | B.p.$_6$=110°C | 0.854 | 1.424 | 2.2 | 67 |
| $CH_2=CH(CH_3)_2SiCl$ | $(CH_3)C_6H_5SiCl_2$ | $CH_2=CH(CH_3)_2SiO(CH_3)C_6H_5SiOSi(CH_3)_2CH=CH_2$ | B.p.$_3$=114°C | 0.93 | 1.463 | 2.56 | 65 |
| $CH_2=CH(CH_3)_2SiCl$ | $(CH_3)_2SiCl_2$ | $CH_2=CH(CH_3)_2SiO(CH_3)_2SiOSi(CH_3)_2CH=CH_2$ | B.p.$_{10}$=57°C | 0.848 | 1.408 | 1.02 | 38 |
| $(CH_3)_2CH_3(CH_2)_5SiCl$ | $(CH_3)_2SiCl_2$ | $(CH_3)_2CH_3(CH_2)_5SiO(CH_3)_2SiOSi(CH_2)_5CH_3(CH_3)_2$ | B.p.$_4$=139–141°C | 0.844 | 1.422 | 3.26 | 38 | then followed in order to obtain the desired organosilicon compounds. The physical properties and the yields of the latter are given in Table VIII below.

TABLE VIII

| Starting silanes (other than SiCl$_4$) CH$_3$R'$_2$SiCl | Products obtained | Boiling point | Density $d_4^{20}$ | Refractive index $n_D^{20}$ | Viscosity in cSt at 25°C | Yield in % |
|---|---|---|---|---|---|---|
| (CH$_3$)$_3$SiCl | Si[OSi(CH$_3$)$_3$]$_4$ | B.p.$_6$=70°C | 0.865 | 1.387 | 3.07 | 70 |
| CH$_2$=CH(CH$_3$)$_2$SiCl | Si[OSi(CH$_3$)$_2$CH=CH$_2$]$_4$ | B.p.$_5$=110°C | 0.904 | 1.419 | 3.7 | 75 |

EXAMPLE 9

Preparation of a product corresponding to the formula F$_2$ in which $n = 0$.

Eleven mols of tertiary amyl alcohol, 5.5 mols of isopropyl alcohol and 500 g of toluene are introduced into a 5 l flask equipped as shown in Example 6. A mixture of chlorosilanes consisting of one mol of the product of the formula Cl$_2$CH$_3$Si—SiCH$_3$Cl$_2$ and 6 mols of the product of the formula (CH$_3$)$_3$SiCl, is run into this solution which is kept at a temperature of 5°C. By following the procedure as shown in part (b) of Example 6, a product of the formula

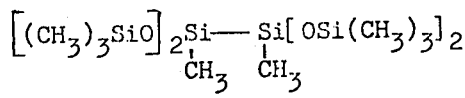

having the following physical properties: B.p.$_{\cdot 2}$ = 85°C, $d_4^{20}$ = 0.874, $n_D^{20}$ = 1.409 and viscosity = 5.17 cSt at 25°C, is obtained with a yield of 23%.

EXAMPLE 10

Preparation of a product corresponding to the formula F$_2$ in which $n = 0$ and G represents a phenylene radical. Six mols of tertiary amyl alcohol, 3 mols of isopropyl alcohol and 600 g of toluene are introduced into a 5 l flask equipped as described in Example 6. A mixture of chlorosilanes consisting of 1 mol of the product of the formula Cl(CH$_3$)$_2$Si—C$_6$H$_4$—SiCl(CH$_3$)$_2$ and 3.5 mols of the product of the formula (CH$_3$)$_3$SiCl, is run into this solution which is kept at a temperature of 5°C. The procedure described in part (b) of Example 6 is followed and the product of the formula $$(CH_3)_3SiOSi-C_6H_4-Si-OSi(CH_3)_3$$
$$(\overset{|}{C}H_3)_2 \quad (\overset{|}{C}H_3)_2$$

having the following physical properties:
B.p.$_{\cdot 3}$=123°C, $d_4^{20}$ = 0.899, $n_D^{20}$ = 1.454 and viscosity = 4.84 cSt at 25°C, is obtained with a yield of 26%.

EXAMPLE 11

Preparation of a product corresponding to the formula F$_2$ in which $n = 0$ and G represents an alkylene radical.

10.6 mols of tertiary amyl alcohol, 5.3 mols of isopropyl alcohol and 600 g of toluene are introduced into a 5 l flask equipped as described in Example 6. A mixture of chlorosilanes consisting of one mol of the product of the formula Cl$_2$CH$_3$Si—CH$_2$CH$_2$—SiCh$_3$Cl$_2$ and 6.6 mols of the product of the formula (CH$_3$)$_3$SiCl, is run into this solution which is kept at a temperature of 5°C. The procedure as shown in part (b) of Example 6 is followed and the product of the formula

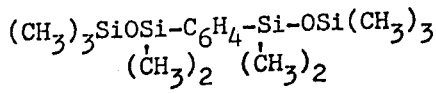

is obtained with a yield of 20%.
B.p.$_{\cdot 4}$ = 116°C.

EXAMPLE 12

A composition Y is prepared by mixing the following ingredients (the parts being by weight):
One hundred parts of a mixture consisting of 91 parts of a polyether-triol of molecular weight 4,800 and 9 parts of a polyether-glycol of molecular weight 800, the preparation of these two polyethers being described in Examples 1 to 4 of French Pat. No. 2,086,977,
three parts of water,
0.8 part of dimethylcyclohexylamine,
0.8 part of a 33% strength solution of triethylenediamine in dipropylene glycol and
ten parts of fluorotrichloromethane.

Furthermore, a composition Y' is prepared by mixing 70 parts of p,p'-diisocyanatodiphenylmethane and 30 parts of toluylenediisocyanate 80–20.

One hundred forty-five g of the composition Y and 60 g of the composition Y' are then mixed intimately and the composition Y'' resulting therefrom is poured into a metal mould of dimensions 200 × 200 × 100 mm, and the mould is closed. The substance is released from the mould after 10 minutes. As soon as it is released from the mould the sample swells slightly; it is calendered immediately by kneading by hand and it acquires flexibility and shows only very little shrinkage but its surface has a rough appearance; its density is 35 g/l. The same foam is manufactured again, but it is left to stand for 35 minutes after it has been released from the mould; at the end of this period of time, it is found that the foam has sagged and that its height in its central part is now only about 75 mm. After manual calendering, the sample cannot recover the dimensions which it had when it was released from the mould and its surface still has a rough appearance.

A part of one of the organosilicon compounds synthesized in Examples 6, 7, 8, 9, 10 and 11 is then added to the composition Y and a series of foams is prepared in accordance with the technique indicated above. The amount of additives used represents 1% of the weight of the polyethers and 0.63% of the weight of the composition Y''.

The measurements indicated in Example 5 are made on the foams produced and are compared with a foam prepared without an additive. The results are given in Tables IX, X, XI and XII below, but the results relating to the uniformity of the density (Table III) do not appear thereon, the variations being too small. Furthermore, since all the organosilicon compounds described in Example 6, or Example 7, or Example 8, each have a practically identical effect, as additives, on the properties of the foams, only one result of the measurements and not a result per organosilicon compound appears in the tables for each example. This result is the average of the results obtained by all of the compounds of the example considered.

TABLE IX

Values of the shrinkage measured after opening the mould, as a function of time.

| Time in minutes | Control without additive | Additive Example 6 | Additive Example 7 | Additive Example 8 | Additive Example 9 | Additive Example 10 | Additive Example 11 |
|---|---|---|---|---|---|---|---|
| 0 | + 18 | + 5 | 0 | + 3 | 0 | + 5 | + 7 |
| 5 | − 10 | − 3 | − 1 | − 2 | 0 | − 1 | − 3 |
| 10 | − 25 | − 5 | − 1 | − 4 | − 3 | − 4 | − 6 |
| 15 | − 30 | − 9 | constant | − 6 | − 7 | − 6 | − 8 |
| 20 | − 28 | − 8 | constant | − 6 | constant | constant | − 7 |
| 25 | − 25 | constant | constant | constant | constant | constant | constant |
| 30 | − 23 | constant | constant | constant | constant | constant | constant |
| 35 | constant | constant | constant | constant | constant | constant | constant |

TABLE X

Notes on the calendering - Shrinkage after calendering

| | Control without additive | Additive Example 6 | Additive Example 7 | Additive Example 8 | Additive Example 9 | Additive Example 10 | Additive Example 11 |
|---|---|---|---|---|---|---|---|
| Notes on the calendering | quite difficult must be carried out immediately | easy, can be delayed for a period of time | easy, can be delayed for a period of time | easy, can be delayed for a period of time | easy, can be delayed for a period of time | easy, can be delayed for a period of time | easy, can be delayed for a period of time |
| Shrinkage after calendering | − 12 | − 2 | 0 | 0 | − 1 | − 2 | − 2 |

TABLE XI

Measurement of the rebound on samples which have been calendered immediately or after standing for 60 hours

| | Control without additive calendering | | Additive Example 6 calendering | | Additive Example 7 calendering | | Additive Example 8 calendering | | Additive Example 9 calendering | | Additive Example 10 calendering | | Additive Example 11 calendering | |
|---|---|---|---|---|---|---|---|---|---|---|---|---|---|---|
| | immediately | after 60 hours | immediately | after 60 hours | immediately | after 60 hours | immediately | after 60 hours | immediately | after 60 hours | immediately | after 60 hours | immediately | after 60 hours |
| Rebound % | 54 | not significant | 54 | 54 | 54 | 54 | 54 | 53 | 53 | 53 | 52 | 51 | 52 | 50 |

TABLE XII

Measurement of the lift in g/cm² - Determination of the "SAG FACTOR" immediately after calendering or after standing for 60 hours before calendering

| % crushing | Control without additive calendering | | Additive Example 6 calendering | | Additive Example 7 calendering | | Additive Example 8 calendering | | Additive Example 9 calendering | | Additive Example 10 calendering | | Additive Example 11 calendering | |
|---|---|---|---|---|---|---|---|---|---|---|---|---|---|---|
| | immediately | after 60 hours | immediately | after 60 hours | immediately | after 60 hours | immediately | after 60 hours | immediately | after 60 hours | immediately | after 60 hours | immediately | after 60 hours |
| 25 | 13 | not significant | 12.5 | 13.5 | 12 | 13 | 13 | 13.5 | 12 | 13 | 13.5 | 13.5 | 12.5 | 13 |
| 50 | 20 | | 21 | 22 | 22 | 21 | 22 | 21 | 21 | 22 | 23 | 22 | 22 | 23 |
| 65 | 35 | | 35 | 36 | 36 | 35 | 37 | 37 | 35 | 36 | 37 | 36 | 35 | 35 |
| SAG FACTOR | 2.7 | | 2.8 | 2.6 | 3 | 2.7 | 2.8 | 2.7 | 2.9 | 2.7 | 2.7 | 2.6 | 2.8 | 2.7 |

On reading these results, it is noted that the foams prepared without organosilicon additives must be calendered as soon as they are released from the mould in order that they may have acceptable properties, but this calendering does not eliminate "the skin effect" on their surface.

EXAMPLE 13

The composition for polyurethane foams of Example 12 is used and is divided into three parts. A different organosilicon compound, chosen from amongst the three compounds of the formulae C₆H₅Si[OSi(CH₃)₃]₃; CH₃-(CH₂)₅Si[OSi(CH₃)₃]₃ and

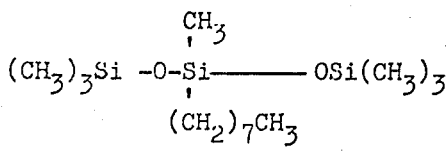

is added, in a proportion of 2% by weight, to each of these three parts.

The foams are prepared in accordance with the technique which is also described in Example 12 and three samples of foams are obtained 10 minutes after casting in the moulds. It is found that each sample completely retains the dimensions of the mould and does not show any shrinkage with time, and moreover their surface is smooth and finely porous. The Sag Factor of each sample is measured and an average value of 3.3 greater than those obtained in Example 12, Table XII, is found; this result thus indicates that the mechanical properties of the foams are very good.

We claim:

1. Process for the production of cold-cured flexible polyurethane foams by pouring into a mould, a foamable composition that will react in the mould to form a flexible polyurethane foam without external application of heat, closing the mould, forming the foam and releasing the foam from the mould, wherein the foamable composition contains 0.1 to 5% of its weight of an organosilicon compound which is a compound of the general formula:

$$(T)_a Si[OSi(CH_3)R'_2]_{4-a}$$

$F_1$ in which each symbol R', which may be the same or different, represents a hydrogen atom, a monovalent hydrocarbon group of 1 to 8 carbon atoms, or a monovalent halogenohydrocarbon group of 1 to 3 carbon atoms; each symbol T, which may be the same or different, represents a hydrogen atom, an alkyl radical with 1 to 15 carbon atoms, a halogenalkyl radical with 1 to 3 carbon atoms, an alkenyl radical with 2 to 4 carbon atoms or a cycloaliphatic radical with 5 to 6 carbon atoms in the ring and $a$ represents zero, 1 or 2.

2. A process according to claim 1, wherein each symbol R', which may be the same or different, represents an alkyl radical of 1 to 8 carbon atoms, a halogenoalkyl radical of 1 to 3 carbon atoms, a vinyl radical or a phenyl radical; and each symbol T, which may be the same or different, represents an alkyl radical of 1 to 15 carbon atoms, a halogenoalkyl radical of 1 to 3 carbon atoms, or a vinyl radical.

3. A process according to claim 1, wherein the foamable composition contains 0.3-3% of the organosilicon compound.

4. A process according to claim 1, wherein the organosilicon compound is incorporated into the foamable composition immediately before foaming.

5. A process according to claim 1, wherein the organosilicon compound is incorporated into the stable mixture which contains all the components for foaming excluding the organic polyisocyanates, the organopolyisocyanate is then added to the reaction mixture and the resulting reaction mixture foamed.

* * * * *